US008368849B2

(12) United States Patent
Chang et al.

(10) Patent No.: US 8,368,849 B2
(45) Date of Patent: Feb. 5, 2013

(54) POLARIZING PLATE WITH BUILT-IN VIEWING ANGLE COMPENSATION FILM AND IPS-LCD COMPRISING SAME

(75) Inventors: Jnn-Won Chang, Daejeon (KR); Dae-Hee Lee, Daejeon (KR); Moon-Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 89 days.

(21) Appl. No.: 12/919,368

(22) PCT Filed: Mar. 24, 2009

(86) PCT No.: PCT/KR2009/001496
§ 371 (c)(1),
(2), (4) Date: Aug. 25, 2010

(87) PCT Pub. No.: WO2009/120009
PCT Pub. Date: Oct. 1, 2009

(65) Prior Publication Data
US 2011/0001906 A1   Jan. 6, 2011

(30) Foreign Application Priority Data

Mar. 24, 2008  (KR) .................. 10-2008-0026876

(51) Int. Cl.
*G02F 1/1335* (2006.01)

(52) U.S. Cl. ............... 349/96; 349/56; 349/84; 349/98; 349/99; 349/101

(58) Field of Classification Search .................. 349/56, 349/84, 96, 98, 99, 101
See application file for complete search history.

(56) References Cited

U.S. PATENT DOCUMENTS

| | | | |
|---|---|---|---|
| 6,646,701 B2 | 11/2003 | Lyu et al. | |
| 7,227,602 B2 | 6/2007 | Jeon et al. | |
| 7,324,180 B2 | 1/2008 | Kashima | |
| 2002/0149733 A1 | 10/2002 | Lyu et al. | |
| 2005/0122456 A1 | 6/2005 | Shuto et al. | |
| 2005/0140900 A1 | 6/2005 | Jeon et al. | |
| 2005/0219449 A1 | 10/2005 | Tanaka | |
| 2006/0203158 A1 | 9/2006 | Parri et al. | |
| 2006/0290853 A1 | 12/2006 | Hong et al. | |
| 2007/0024792 A1* | 2/2007 | Chang et al. | ............... 349/141 |

FOREIGN PATENT DOCUMENTS

| | | |
|---|---|---|
| CN | 1777834 A | 5/2006 |
| JP | 2002-333642 | 11/2002 |
| JP | 2004-118185 A | 4/2004 |
| JP | 2006-522947 | 10/2006 |
| JP | 2006-524347 | 10/2006 |
| JP | 4137438 | 6/2008 |
| KR | 2005-0039587 A | 4/2005 |
| WO | WO 2005/038517 A | 4/2005 |

* cited by examiner

*Primary Examiner* — Jennifer Doan
(74) *Attorney, Agent, or Firm* — McKenna Long & Aldridge, LLP

(57) ABSTRACT

There is provided a polarizer integrally containing view angle compensating film used in an in-plane switching liquid crystal display (IPS-LCD) filled with liquid crystal ($\Delta \in >0$) having positive dielectric anisotropy and an in-plane switching liquid crystal display comprising the same. More particularly, there is provided an integrated polarizer capable of being used to manufacture a thin polarizer and securing a good view angle by employing a view angle compensating film as a protective film of a polarizing film forming the polarizer and an IPS-LCD comprising the same. The integrated polarizer comprises a polarizing film; a protective film attached to one surface of the polarizing film; and a +A plate coated with a +C plate attached to the other surface of the polarizing film. The +C plate is coated in the form of liquid crystals.

4 Claims, 7 Drawing Sheets

(a)                (b)

POLARIZING PLATE WITH BUILT-IN VIEWING ANGLE COMPENSATION FILM AND IPS-LCD COMPRISING SAME

This application is a National Stage Entry of International Application No. PCT/KR2009/001496, filed Mar. 24, 2009, and claims the benefit of Korean Application No. 10-2008-0026876, filed on Mar. 24, 2008, which is hereby incorporated by reference for all purposes as if fully set forth herein.

TECHNICAL FIELD

The present invention relates to a polarizer integrally containing view angle compensating film used in an in-plane switching liquid crystal display (IPS-LCD) filled with liquid crystal ($\Delta\epsilon>0$) having positive dielectric anisotropy and an in-plane switching liquid crystal display comprising the same, and more particularly, to an integrated polarizer capable of being used to manufacture a thin polarizer and securing a good view angle by employing a view angle compensating film as a protective film of a polarizing film forming the polarizer and an IPS-LCD comprising the same.

BACKGROUND ART

Liquid crystal display (hereinafter, simply referred to as 'LCD') is a display device that displays a desired image by selectively enabling light emitted from a backlight unit to penetrate into respective pixels with the polarization of liquid crystals.

Among the liquid crystal displays, an in plane switching liquid crystal display (IPS-LCD) has advantages in that its view angle is wider than those of widely used twisted nematic (TN) LCDs. That is, the IPS-LCD has liquid crystals that are not vertically aligned but aligned in parallel with a transverse surface of the electrode by disposing on the same plane electrodes of cells in which liquid crystal are aligned. That is, when an electric filed is formed as shown in FIG. 1, the alignment direction of liquid crystals is changed on a screen of the liquid crystal display FIG. 1 shows the movement of liquid crystal molecules in each liquid crystal pixel of widely used IPS-LCD. As shown in FIG. 1, when no electric filed is formed between a common electrode 10 and a pixel electrode 20, the liquid crystal molecules are disposed in each pixel so that they can be in parallel to a rubbing direction of the liquid crystal molecules. When the rubbing direction is parallel to the absorption axis of a polarizer adjacent to a backlight unit, this display device is called an O-mode IPS-LCD. Also, when the rubbing direction is vertical to the absorption axis of the polarizer adjacent to the backlight unit, this display device is called an E-mode IPS-LCD. An observer-side polarizer has an absorption axis vertical to the absorption axis of a polarizer adjacent to the backlight unit regardless of the modes. FIGS. 2 and 3 show the O-mode IPS-LCD. As shown in FIGS. 2 and 3, the IPS-LCD has polarizers formed both sides of liquid crystal cells so that their absorption axes can be vertical to each other. Since the light passed through a light source-side polarizer reaches an upper polarizer in IPS-LCD without causing any phase retardation when an electric filed is not formed in the polarizers, the light is not passed through the upper polarizer. As a result, pixels are in a dark state, generally called a normally black mode. As shown in FIGS., attention should be paid to the fact that the term 'IPS-LCD' used in the present invention includes Super-IPS, fringe field switching (FFS), reverse TN IPS, etc.

In the other case, when an electric filed is formed between the common electrode and the pixel electrode, an alignment direction of the liquid crystals is changed by the rotation of the liquid crystals. Therefore, the light that is passed through the light source-side polarizer is also passed through the observer-side polarizer, thus to allow pixels to emit light.

These liquid crystals in the IPS-LCD has more improved visibility than TN-LCD when the light is emitted aslant, that is, when the light is observed aslant by an observer. This is why the TN LCD has liquid crystal alignment layers disposed on and down the liquid crystal cells; and electrodes disposed on and down the liquid crystal cells. When the liquid crystals are aligned by an electric filed, a zone where the liquid crystals are aligned aslant to a vertical direction is formed, and thus the high phase retardation may be caused according to the alignment of the inclined liquid crystals. As a result, the light passed through the liquid crystals is not completely linearly polarized but elliptically polarized to cause light leakage where some light is leaked or not completely passed through the liquid crystals. When the light leakage occurs, the contrast ratio is deteriorated, which leads to the severely low visibility.

In the case of the IPS-LCD, a zone where the liquid crystals are aligned aslant to the vertical direction is not formed when the liquid crystals are re-aligned, and thus the changes in phase retardation according to the alignment of the inclined liquid crystals are not too high. Therefore, the IPS-LCD has been widely used as a liquid crystal display with a wide view angle.

However, a light path in the liquid crystal cells is lengthened in the case of the IPS-LCD when the light is emitted aslant, and the emitted light is more weakly elliptically polarized than when the light is emitted to the front side. Also, since the aslant emitted light is leaked on the polarizer, it is necessary to compensate for the phase retardation.

A view angle compensating film has been widely used to compensate for the phase retardation. Here, the view angle compensating film refers to a film having a phase retardation opposite to the phase retardation of the aslant emitted light so that its phase retardation can be induced inversely with respect to the phase retardation of the aslant emitted light.

However, since the phase retardation of the aslant emitted light is not uniform according to the emission angle or conditions of light, the kind or level of the phase retardation of a retardation film is generally determined by much minute research.

The retardation film functions to inversely compensate for the phase retardation which may be caused in liquid crystals or polarizers, and films having a phase retardation are generally used as the retardation film. The retardation film may be divided into an A plate, a C plate and a B plate, depending on the kinds of the retardation film.

Herein, the expression 'A plate and C plate' is meant to be divided according to refractive index anisotropy of the respective plates. Hereinafter, detailed descriptions of the A and B plates are as follows.

That is, materials through which the light is passed have refractive indexes ($n_x$, $n_y$, $n_z$) with respect to x, y and z axes, respectively. Here, when a material has the same refractive indexes, this material is called isotropic, and when a material has partially or completely different refractive indexes, this material is called anisotropic. For convenience' sake, when it is assumed that a thickness direction of a film is z direction, one of two plane directions of the film is x direction, and the other of the plane directions is y direction, the refractive indexes are represented by refractive indexes in the directions as shown in FIG. 6, respectively.

Here, when a film has the same refractive indexes in two directions but different refractive indexes in one direction, this film is called a uniaxial film. Also, when a film has different refractive indexes in all three directions, this film is called a biaxial film.

Among the uniaxial films, when a film has different refractive indexes in a plane direction, this film is called an A plate. In this case, a refractive index of the A plate may be represented by the following Equation 1, and an in-plane phase retardation ($R_{in}$) in the A plate may be represented by the following Equation 2.

$$nx \neq ny = nz \qquad \text{Equation 1}$$

$$R_{in} = d \times (nx - ny) \qquad \text{Equation 2}$$

wherein, d represents a thickness of a plate (a film).

In Equation 1, when a film satisfies the requirements of Equation: nx>ny, this film is called a +A plate, and when a film satisfies the requirements of Equation: nx<ny, this film is called a −A plate.

Also among the uniaxial films, when a film has different refractive indexes in a thickness direction, this film is called a C plate. In this case, a refractive index of the C plate may be represented by the following Equation 3, and a thickness-direction phase retardation ($R_{th}$) in the C plate may be represented by the following Equation 4.

$$nx = ny \neq nz \qquad \text{Equation 3}$$

$$R_{th} = d \times (nz - ny) \qquad \text{Equation 4}$$

In Equation 2, when a film satisfies the requirements of Equation: nx<ny, this film is called a +C plate, and when a film satisfies the requirements of Equation: nx>ny, this film is called a −C plate.

Also, the biaxial film is referred to as a film whose in-plane and thickness-direction phase retardations are all varied. Among the biaxial films, a −B plate has a relationship of Equation: nx>ny>nz.

Since IPS liquid crystal cells themselves function as a +A-plate having a high phase retardation value, there has been proposed a technique using a −A plate as a view angle compensating film in order to compensate for the phase retardation in the prior art. The −A plate is manufactured by aligning discotic liquid crystals at constant alignment. Manufacturing the −A plate using the discotic liquid crystals as described above is difficult to be realized, and this manufacturing method has problems regarding the optical axis deviation, etc. Therefore, the −A plate has no sufficient performance. In consideration of the recent technologies, it is also impossible to manufacture a −A plate using the nematic liquid crystals.

As an alternative, there has been proposed a view angle compensating film that compensates for the phase retardation caused in IPS liquid crystal cells by stacking a +C plate on a −B plate, as shown in FIG. 4. However, this manufacturing method also has problems in that it is difficult for the view angle compensating film to secure a sufficient contrast ratio according to various view angles, and pixel colors may be generally tinged with red.

Furthermore, the conventional view angle compensating film was attached as a separate layer to a polarizer, and then used to compensate for the phase retardation caused in the IPS-LCD. However, this separate layer such as the view angle compensating film may cause an increase in the total thickness of a panel.

DISCLOSURE

Technical Problem

The present invention is designed to solve the problems of the prior art, and therefore it is an aspect of the present invention to provide a new type of a polarizer, and an IPS-LCD comprising the polarizer, wherein the polarizer is able to reduce a thickness of a panel and to save the manufacturing cost.

Technical Solution

According to an aspect of the present invention, there is provided an integrated polarizer including a polarizing film; a protective film attached to one surface of the polarizing film; and a +A plate coated with a +C plate, which is in the form of liquid crystals, the +C plate being attached to the other surface of the polarizing film to which the protective film is attached.

According to another aspect of the present invention, there is provided an in-plane switching liquid crystal display (IPS-LCD) including an integrated polarizer, which include a +A plate coated with the +C plate, which is in the form of liquid crystals, wherein the integrated polarizer includes a polarizing film; a protective film attached to one surface of the polarizing film; and a +A plate coated with a +C plate in the form of liquid crystals, the +C plate being attached to the other surface of the polarizing film to which the protective film is attached, wherein the +A plate coated with the +C plate in the integrated polarizer is disposed on the side of the liquid crystal cells.

In this case, the +A plate may preferably have an in-plane phase retardation of 30 to 500 nm, more preferably of 90 to 150 nm, and most preferably of 110 to 130 nm with respect to the light of 550 nm wavelength.

Also, the +C plate may preferably have a thickness-direction phase retardation of 60 to 100 nm, more preferably of 70 to 90 nm, and most preferably of 70 to 80 nm with respect to the light of 550 nm wavelength.

In addition, the +A plate coated with the +C plate in the form of liquid crystals may have Nz ($|1-R_{th}/R_{in}|$) of 0.15 to 0.5.

According to still another aspect of the present invention, there is provided an integrated polarizer including a polarizing film; a protective film attached to one surface of the polarizing film; and a +A plate coated with a +C plate attached to the other surface of the polarizing film to which the protective film is attached.

Advantageous Effects

As described above, the polarizer and the IPS-LCD according to one exemplary embodiment of the present invention may be useful to reduce the thickness and save the manufacturing cost since a protective film used in conventional panels may be not used herein, and the C plate may also be reduced in thickness.

BEST MODE

Figure 1:
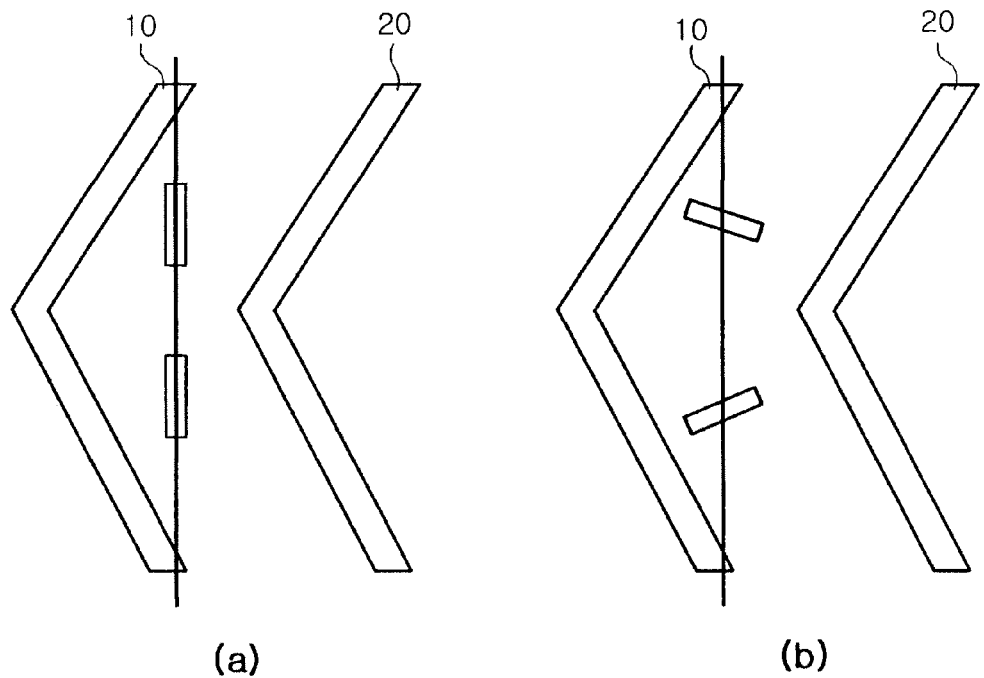
FIG. 1 is a schematic view illustrating the change in arrangement of liquid crystals in an in-plane switching liquid crystal display (IPS-LCD).
Figure 2:
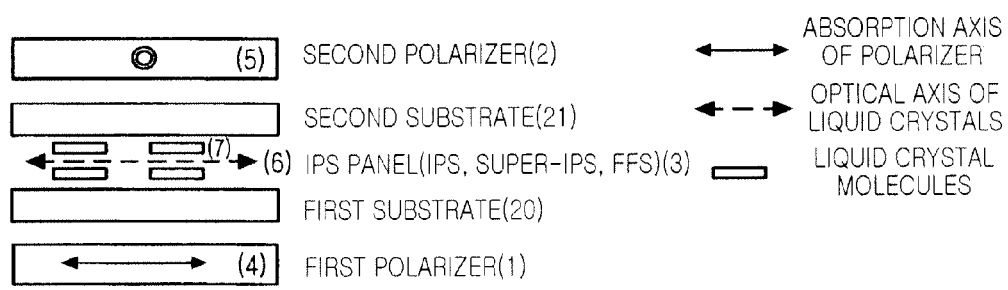
FIG. 2 is a schematic view illustrating a stacking pattern in an IPS-LCD that does not include a view angle compensating film.

Hereinafter, exemplary embodiments of the present invention are now described in more detail.

The present inventors have made ardent attempts to solve the above problems, and found that it is preferred to coating a +A plate with a +C plate in the form of a thin film without manufacturing the +A plate and +C plate as separate layers and stacking them on each other, and the +A plate coated with the +C plate in the form of a thin film is preferably used as a protective film of a polarizer. Therefore, the present invention was completed on the basis of the above facts.

That is, a polarizer and an IPS-LCD including the polarizer according to one exemplary embodiment of the present invention have the two following major characteristics.

1) A +C plate is coated onto a +A plate. Here, the +C plate is coated in the form of liquid crystal compound to show phase retardation.

2) The +A plate coated with the +C plate is used as a liquid crystal cell-side protective film among protective film of a polarizer.

First of all, a coating configuration of a plate is described in more detail. In accordance with the present invention, a two-layered plate, which is formed by coating a +A plate with a +C plate, is used herein. When the two-layered plate as described above is used herein, one exemplary embodiment of the present invention may be easily realized by coating vertically oriented liquid crystals (for example, nematic liquid crystals) on a +A plate.

In this case, the above-mentioned configuration of the disposed plates has an advantage in that they may be reduced in thickness, compared to a conventional laminate of view angle compensating film. That is, the stacking of several films requires the use of adhesive layers between the films, and thus a thickness of the view angle compensating film may be increased due to the use of the adhesive layers.

However, when the +A plate is coated with the +C plate as provided in the present invention, the +C plate should not have a sufficient thickness to maintain its shape. This is why a material having a sufficiently high refractive index anisotropy to compensate for the thickness of the +C plate is used so that the +C plate can have a desired thickness-direction phase retardation as represented by Equation 4. Therefore, the thickness of the +C plate may be reduced by 1 μm or less. Also, an alignment layer may be formed between the +C plate and the +A plate, but the alignment layer may not be formed, and there is no problem in aligning liquid crystals. Therefore, when the alignment layer may not be formed, a view angle compensating film may be significantly reduced in thickness. Owing to the above-mentioned reasons, the view angle compensating film in which the +C plate is coated onto the +A plate may be significantly reduced in thickness, compared to that of a compensating film in which the plates are coupled by means of an adhesive.

In this case, the +A plate preferably has an in-plane phase retardation value of approximately 30 to 500 nm, more preferably approximately 90 to 150 nm and the most preferably approximately 110 to 130 nm in respect to light of 550 nm wavelength, so that the +A plate can be suitably used in IPS-LCD.

Also, the +C plate preferably has a thickness-direction phase retardation value of approximately 60 to 100 nm, more preferably approximately 70 to 90 nm, and the most preferably approximately 70 to 80 nm in respect to light of 550 nm wavelength.

This is why the phase retardation that may be compensated for by each of the view angle compensating films is in a more extended range than the phase retardation caused by the polarizer since the light leakage in a dark state of the IPS-LCD is mainly caused by the polarizer and partially caused by crystal cells of the IPS-LCD. In order to minimize the light leakage in a vertically crossed state of the polarizer, the phase retardation value of the +A plate is in a range of 30 to 500 nm, and the phase retardation value of the +C plate is in a range of approximately 60 to 100 nm. Accordingly, the phase retardation is determined on the basis of the phase retardation values of the +A and +C plates. However, when the +A plate has an in-plane phase retardation value of approximately 90 to 150 nm and the +C plate has a thickness direction phase retardation value of approximately 70 to 90 nm, the +A and +C plates show the excellent effect to improve their contrast ratios and color characteristics.

Also, Nz (i.e., an absolute value of (1−(thickness-direction phase retardation value/in-plane phase retardation value))) represented by the following Equation 5 does not need to be in a range of 0.15 to 0.50 even at the above-mentioned wavelength ranges.

$$Nz = |1 - R_{th}/R_{in}|$$ Equation 5

This is a value that is necessary to obtain a sufficient effect of compensating for the view angle when the +A plate is coated with +C plate, and used as an inner protective film of the polarizer as described above. In this case, when the Nz is too low or too high, the oblique angle contrast and color characteristics are poor, resulting in the damaged optical properties. Therefore, the Nz is preferably controlled to be in the suitable range.

Any commonly used types of +A plates may be used as the +A plate when they satisfy the requirements regarding the range of phase retardation. Also, liquid crystals used to form the +C plate may also form a layer of the +C plate with a desired wavelength range as a thickness of the liquid crystals is changed. Therefore, any conventional coatable materials of the liquid crystals may be used without limitations, and vertically aligned materials of the liquid crystals are particularly preferred.

Figure 5:
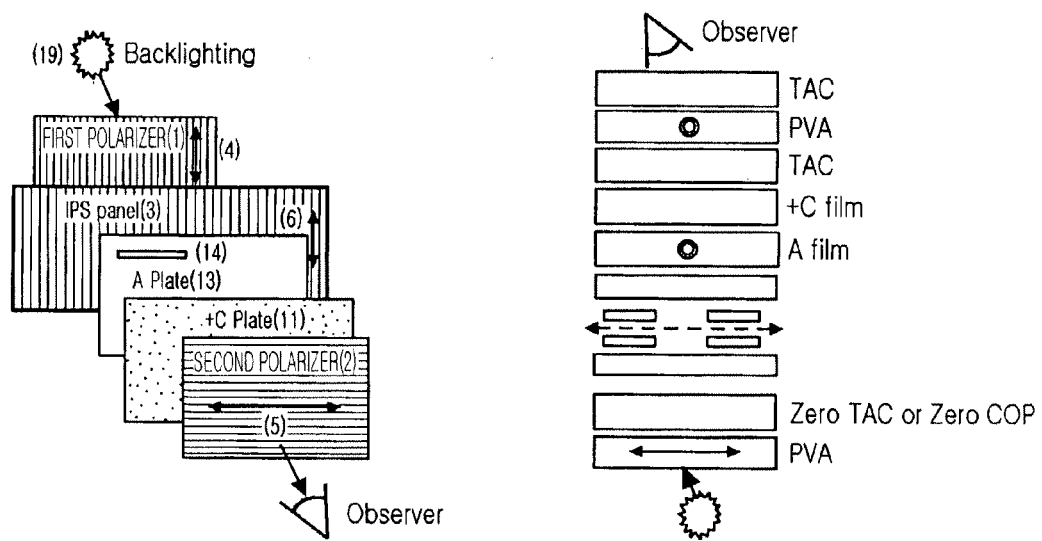
FIG. 5 is a schematic view illustrating a stacking pattern in a conventional IPS-LCD having a +A plate and a +C plate stacked as separate layers thereon.
Figure 6:
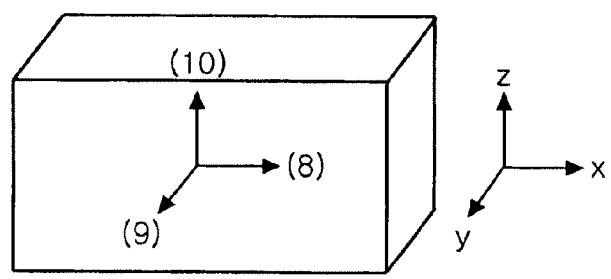
FIG. 6 is a coordinate chart in which each axis is represented to explain the refractive index.

Next, a configuration of the integral polarizer in which the above-mentioned +C plate-coated +A plate is used as a protective film of the polarizer is described in detail, as follows. In general, the polarizer has an integral retardation film in which a film having an in-plane phase retardation value, which is used as a protective film to protect stretched polyvinylealchol (stretched PVA) as a polarizing film (element), is coated with a liquid crystal material having a thickness direction phase retardation value, as shown in FIG. 5, or comprises triacetate cellulose (TAC) having a thickness direction phase retardation value, biaxial COP having an in-plane phase retardation value and a thickness direction phase retardation value together, or cyclo-olefin (COP), zero TAC and acrylic films having no thickness direction phase retardation value. The protective films have little phase retardation value, but have dispersion characteristics such as inverse dispersion, flat dispersion and normal dispersion.

However, a uniaxial A plate is also made of materials having dispersion characteristics such as inverse dispersion, flat dispersion and normal dispersion. According to the research results conducted by the present inventors, it was revealed that when the uniaxial A plate and the protective film of the polarizer are used together, the additional light leakage may be caused by the overlapped dispersion characteristics. Therefore, the research results show that either the A plate or the protective film is preferably removed since one of them is an unnecessary film.

Accordingly, the present inventors have proposed an integral polarizer according to the present invention, considering that the A plate may perform the functions of the protective film and reduced in thickness due to the removal of the protective film when it is used as an alternative film of the protective film of the polarizer. That is to say, since an adhesive layer, which should be provided between the protective film and a view angle compensating film, may be also removed together with the protective film when the protective film is removed, it is effective to reduce an entire thickness of a panel, its manufacturing costs may be curtailed, and the additional light leakage, which is caused in the use of the A plate and the protective film together, may be prevented.

Figure 7:
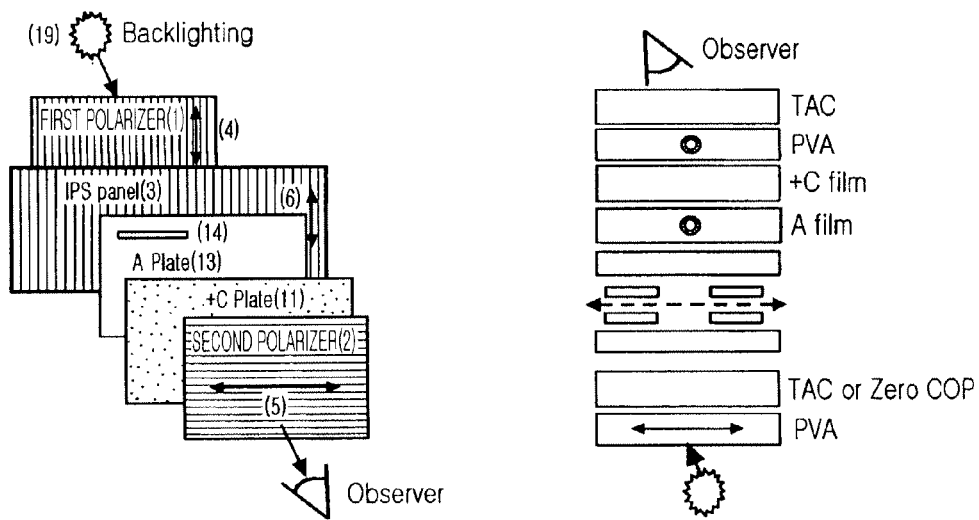
FIG. 7 is schematic view illustrating a stacking pattern in which a +C plate is coated onto a +A plate and used as an inner protective film of a polarizer according to one exemplary embodiment of the present invention.
Figure 8:
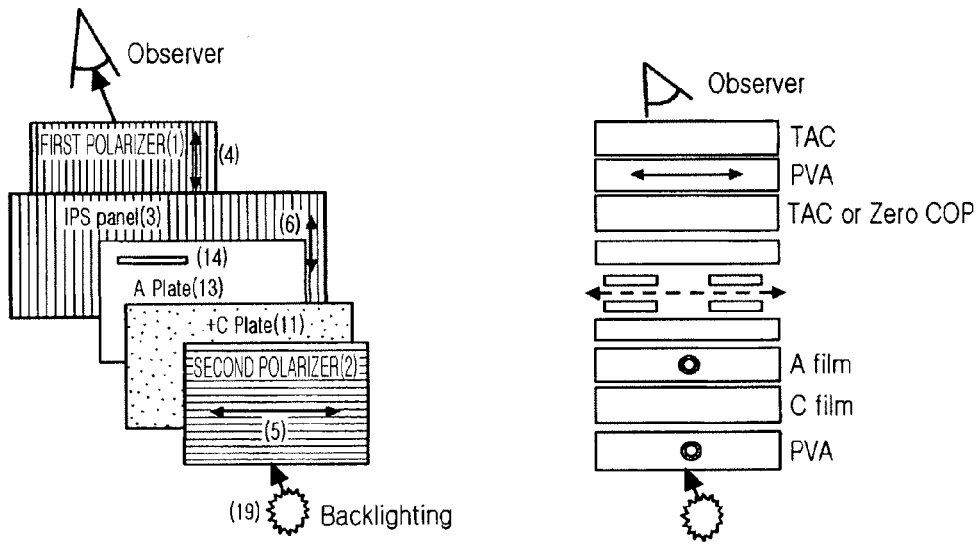
FIG. 8 is schematic view illustrating the same stacking pattern as in FIG. 7, provided that a light source and an observer are disposed in a reverse position to those shown in FIG. 7.

That is to say, the integral polarizer according to one exemplary embodiment of the present invention is characterized in that it includes a polarizing film, a protective film attached to one side of the polarizing film, and a +A plate attached to an opposite side of the side to which the protective film of the polarizing film is attached, the +A plate being coated with a +C plate in the form of liquid crystals, as shown in the configuration of the IPS-LCD of FIGS. 7 and 8.

In particular, it is desirable for the use of a roll-to-roll process that an absorption axis of the +A plate is arranged parallel to an absorption axis of the polarizing film, and in order to satisfy this axis arrangement, the +C plate is necessarily arranged in one side of the polarizing film. Therefore, it is more desirable to arrange the +C plate in one side of the polarizing film.

FIG. 7 shows an observer-side polarizer used as an integral polarizer according to one exemplary embodiment of the present invention, and FIG. 8 shows a light source-side polarizer used as an integral polarizer according to one exemplary embodiment of the present invention.

Also, the IPS-LCD according to one exemplary embodiment of the present invention is an IPS-LCD comprising the integral polarizer attached to one side of liquid crystal cells, wherein a +A plate coated with a +C plate of the integral polarizer is formed in a direction of the liquid crystal cells. When the +A plate is applied to one of the sides of the polarizer as described above, the +A plate acts as the inner protective film, which leads to the reduction in thickness of the IPS-LCD.

Mode for Invention

Hereinafter, exemplary embodiments of the present invention are now described in more detail.

Hereinafter, the present invention will be described in more detail in connection with the exemplary embodiments. However, it is understood that the description proposed herein is just a preferable example for the purpose of illustrations only, not intended to limit the scope of the invention. Accordingly, it is considered that the scope of the invention is determined by the appended claims and items rationally derived from the appended claims.

EXAMPLES

Comparative Example 1

IPS-LCD that does not Comprise a View Angle Compensating Film

Figure 3:
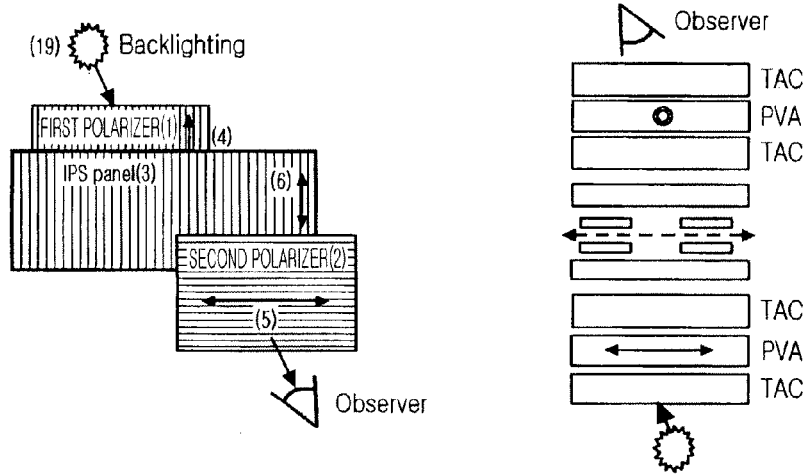
FIG. 3 is a schematic view more minutely illustrating a stacking pattern of polarizers in an IPS-LCD that does not include a view angle compensating film

The change in contrast ratio of the IPS-LCD, which does not comprise a view angle compensating film as shown in FIG. 3, was observed. In FIG. 3, an observer-side polarizer (represented by a second polarize for the sake of convenience, hereinafter a first polarizer and a second polarizer may be varied) 2 is arranged so that an absorption axis 5 of the observer-side polarizer 2 can be vertical to the optical axis of liquid crystals and the absorption axis 4 of the light source-side polarizer (or a first polarizer) 1. In FIG. 3, a cyclo-olefin (COP), zero TAC or acrylic film having a phase retardation value of nearly 0 may be used as an inner protective film of the first polarizer 1 among the two polarizers. In this case, a zero TAC was used in this example. Also, a TAC film having a thickness of 50 μm and a thickness direction phase retardation value, $R_{th}$, of −30 nm is used as an inner protective film of the second polarizer 2. Since outer protective films of these polarizers do not affect polarization of the polarizers, any films used as an outer protective film in the art may be used herein. Non-limiting examples of the outer protective film include TAC, acrylic film, etc. A TAC film was used in this exemplary embodiment.

Figure 9:
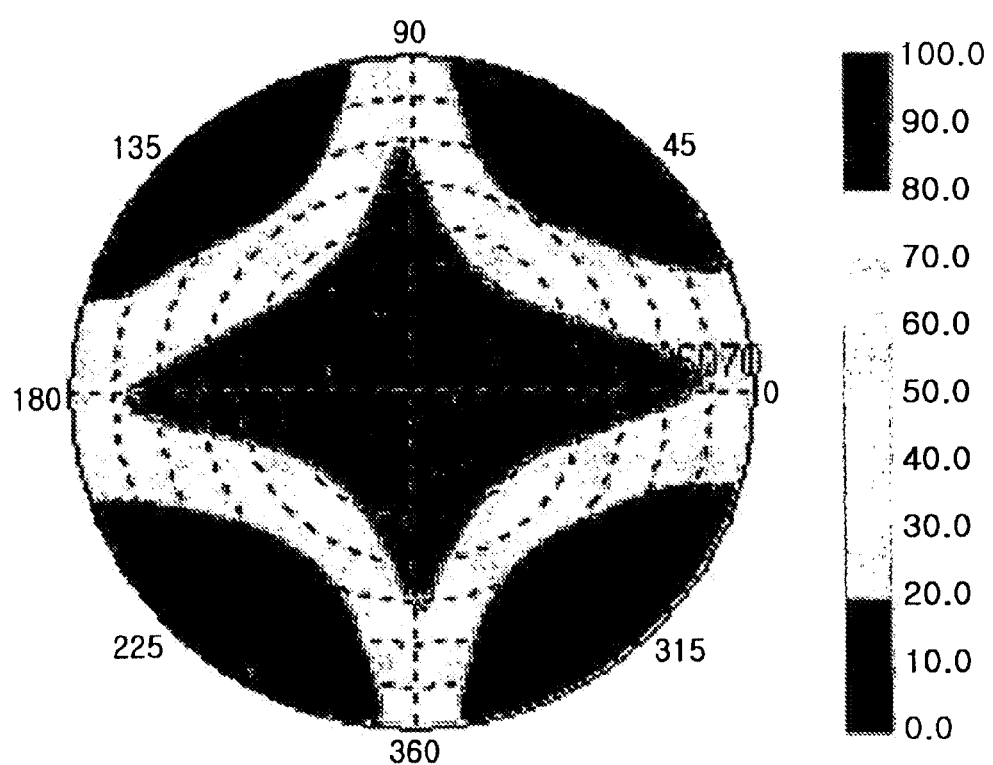
FIG. 9 is a graph illustrating a contrast ratio of the IPS-LCD provided in Comparative example 1.

Also, liquid crystal cells 3 of an IPS-panel are filled with liquid crystals having a cell distance of 3.3 μm (an in-plane phase retardation of 330 nm), a pretilted angle of 1.4°, a dielectric anisotropy, $\Delta \in = +7$ and a birefringence, $\Delta n=0.1$ at 550 nm wavelength. As listed in Table 1 and shown in FIG. 9, it was revealed that when these polarizers are applied to the IPS-panel, the inner protective films of the polarizers may have a minimum contrast ratio of 10:1 at an inclined angle of 75° in respect to all the longitudinal angles.

TABLE 1

| Inner protective film of first polarizer | IPS-LCD | Inner protective film of second polarizer | Minimum contrast ratio |
|---|---|---|---|
| TAC of 80 μm thickness and 0 nm phase retardation value | 330 nm | TAC of 50 μm thickness and −30 nm phase retardation value | 10:1 |

Comparative Example 2

IPS-LCD Comprising Both of a View Angle Compensating Film and a Polarizer as Separate Layers The changes in contrast ratio of the IPS-LCD were observed when the view angle compensating films are used in form of a separate film without the use of the protective film of the polarizer as shown in FIG. 5. As shown in FIG. 5, it was revealed that the first polarizer 1 is arranged so that its absorption axis can be vertical to the absorption axis 5 of the second polarizer, and a uniaxial retardation film (A-film) adjacent to the second polarizer is arranged so that its optical axis 14 can be parallel to the absorption axis 5 of the second polarizer. As the protective film of the first polarizer 1 adjacent to a glass surface of the panel, materials such as TAC, COP or acrylic films may be use, which has nearly no phase retardation value and shows dispersion characteristics such as inverse dispersion, flat dispersion and normal dispersion. In this case, TAC is used in this example, and TAC is also used as a film opposite to the glass surface of the panel. As the protective film of the second polarizer 2, TAC that has a thickness of 50 μm and a thickness direction phase retardation value, $R_{th}$, of −30 nm was used, which is selected from the films that has a certain phase retardation value and dispersion characteristics such as inverse dispersion, flat dispersion and normal dispersion. The +C-Plate 12 was manufactured from a UV-cured, vertically arranged liquid crystal film, and had a thickness direction phase retardation value of 100 to 120 nm at 550 nm wavelength, as listed in Table 2. As the A plate 12 having the dispersion characteristics such as inverse dispersion, flat dispersion and normal dispersion, a stretched polycarbonate (PC), COP or acrylic film may be used. COP was used in this exemplary embodiment. As listed in Table 2, it was revealed that the in-plane phase retardation value of the A plate is in a range of 100 to 130 nm.

Figure 10:
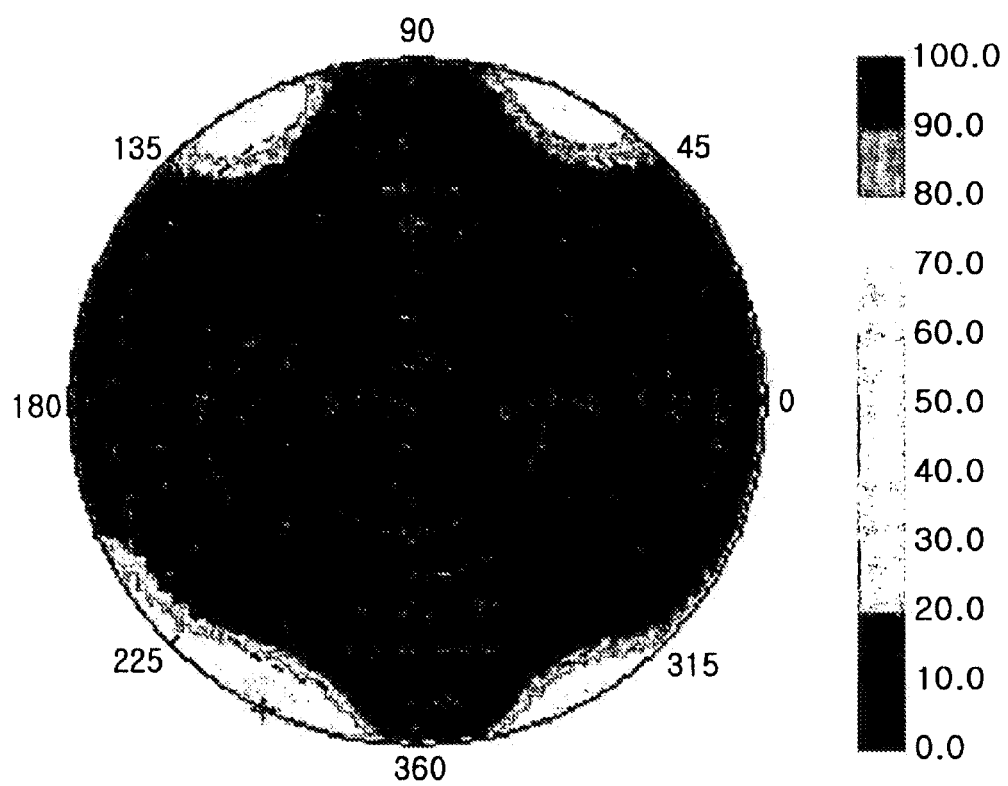
FIG. 10 is a graph illustrating a contrast ratio of the IPS-LCD provided in Comparative example 2.

Also, the liquid crystal cells 3 are filled with liquid crystal having a cell distance of 3.3 μm (an in-plane phase retardation of 330 nm), a pretilted angle of 1.4°, a dielectric anisotropy, $\Delta \in = +7$ and a birefringence, $\Delta n=0.1$ at 550 nm wavelength. As listed in the following Table 2 and shown in FIG. 10 satisfying, among the conditions as listed in Table 2, that the in-plane phase retardation of the +A plate is 120 nm and the thickness direction phase retardation of the +C plate is 110 nm, it was confirmed that when these polarizers are applied to the IPS-panel, the inner protective films of the polarizers may have a minimum contrast ratio of 35:1 at an inclined angle of 75° (40:1 in the results of FIG. 10) in respect to all the longitudinal angles.

Inventive Example

Integral Polarizer Comprising a-+C Plate-Coated +A Plate

The changes in contrast ratio of the IPS-LCD were observed when the +C plate-coated +A plate was used as the inner protective film of the polarizer as shown in FIG. 7. As shown in FIG. 7, it was revealed that the first polarizer 1 is arranged so that its absorption axis can be vertical to the absorption axis 5 of the second polarizer, and a uniaxial retardation film (A plate) adjacent to the second polarizer is arranged so that its optical axis 14 can be parallel to the absorption axis 5 of the second polarizer. As the protective film of the first polarizer 1 among the two polarizers, a COP (cyclo-olefin), zero TAC or acrylic film having a phase retardation value of nearly 0 may be used. In this case, TAC is used in this example. As the protective film of the second polarizer 2, a film in which the +A plate 13 is coated with the +C plate 11 made of liquid crystals was also used. In this case, as listed in Table 3, the in-plane phase retardation of the +A plate was in a range of 110 to 130 nm, and the thickness direction phase retardation of the +C plate was in a range of 60 to 140 nm. COP or acrylic film may be used as the A plate. In this case, COP was used in this example.

Figure 11:
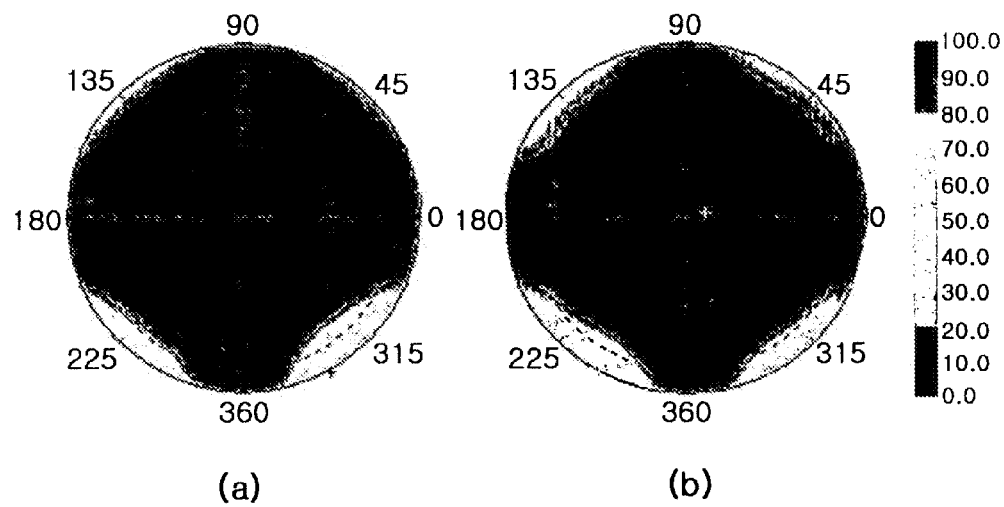
FIG. 11 is a graph illustrating a contrast ratio of the IPS-LCD provided in Inventive example.

Also, the liquid crystal cells 3 are filled with liquid crystal having a cell distance of 3.3 μm (an in-plane phase retardation of 330 nm), a pretilted angle of 1.4°, a dielectric anisotropy, $\Delta \in = +7$ and a birefringence, $\Delta n=0.1$ at 550 nm wavelength. As in the following Table 3 and shown in FIG. 11 (*a*) satisfying, among the conditions as listed in Table 3, that the in-plane phase retardation of the +A plate is 120 nm and the thickness direction phase retardation of the +C plate is 70 nm, it was confirmed that when the integral polarizer is applied to the IPS-panel, the inner protective films of the integral polarizer may have a minimum contrast ratio of 60:1 at an inclined angle of 75° in respect to all the longitudinal angles. For reference, the results, which were obtained in an opposite direction of the observer and the light source of the IPS-LCD of FIG. 7 as shown in FIG. 8, were shown in FIG. 11 (*b*).

TABLE 2

| Inner protective film of first polarizer | IPS-LCD | In-plane phase retardation of +A plate | Thickness direction phase retardation of +C plate | Inner protective film of second polarizer | Minimum contrast ratio |
|---|---|---|---|---|---|
| TAC of 80 μm thickness and 0 nm phase retardation value | 330 nm | 100 nm 110 nm 120 nm 130 nm | 100 nm 115 nm 110 nm 120 nm | TAC of 50 μm thickness and −30 nm phase retardation value | 35:1 40:1 40:1 45:1 |

TABLE 3

| Inner protective film of first polarizer | IPS-LCD | In-plane phase retardation of +A plate | Thickness direction phase retardation of +C plate | Inner protective film of second polarizer | Minimum contrast ratio |
|---|---|---|---|---|---|
| TAC of 80 μm thickness and 0 nm phase retardation value | 330 nm | 110 nm 110 nm 120 nm 130 nm | 70 nm 80 nm 70 nm 80 nm | Integral film (+C plate-coated +A plate) | 65:1 60:1 60:1 70:1 |

Comparative Example 3

Integral Polarizer Comprising a-+C Plate-Coated +B Plate

Figure 4:
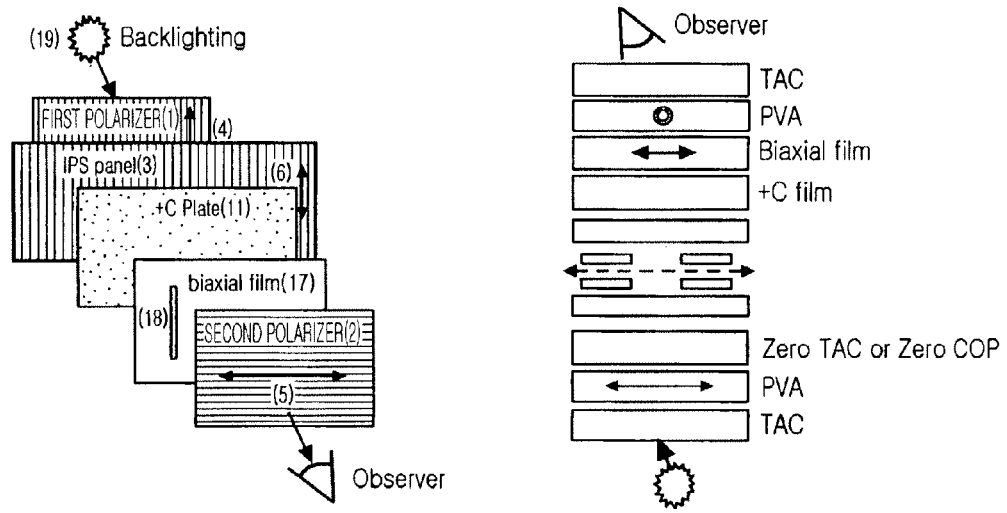
FIG. 4 is a schematic view illustrating a stacking pattern in which a +C plate is coated onto a −B plate and used as an inner protective film of a polarizer according to another exemplary embodiment of the present invention.

The changes in contrast ratio of the IPS-LCD were observed when the +C plate-coated B plate was used as the inner protective film of the polarizer as shown in FIG. 4. As shown in FIG. 7, it was revealed that the first polarizer 1 is arranged so that its absorption axis can be vertical to the absorption axis 5 of the second polarizer, and a biaxial retardation film (B plate) adjacent to the second polarizer is arranged so that its optical axis 14 can be parallel to the absorption axis 5 of the second polarizer. As the protective film of the first polarizer 1 among the two polarizers, a COP (cyclo-olefin), zero TAC or acrylic film having a phase retardation value of nearly 0 may be used. In this case, zero TAC is used in this exemplary embodiment. As the protective film of the second polarizer 2, a film in which the B plate 13 having a thickness of 80 μm is coated with the +C plate 11 made of liquid crystals was also used. In this case, as listed in Table 4, the in-plane phase retardation of the B plate was in a range of 90 to 120 nm and the thickness direction phase retardation of the B plate was in a range of −60 to −75 nm, the thickness direction phase retardation of the +C plate was in a range of 100 to 150 nm. COP or acrylic film may be used as the A plate. In this case, COP was used as the B plate in this exemplary embodiment.

Figure 12:
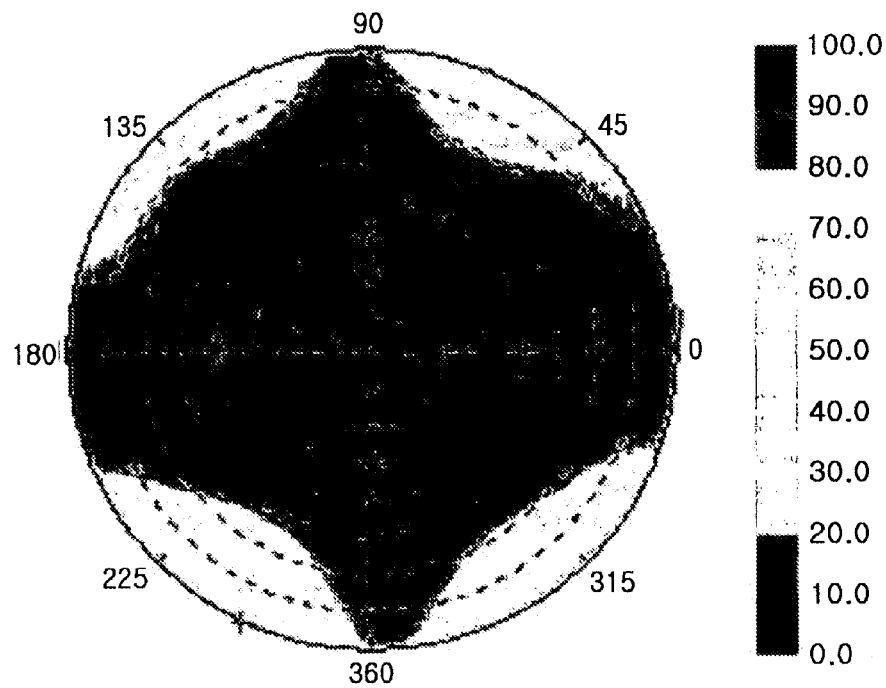
FIG. 12 is a graph illustrating a contrast ratio of the IPS-LCD provided in Comparative example 3.

Also, the liquid crystal cells 3 are filled with liquid crystal having a cell distance of 3.3 μm (an in-plane phase retardation of 330 nm), a pretilted angle of 1.4°, a dielectric anisotropy, $\Delta\epsilon=+7$ and a birefringence, $\Delta n=0.1$ at 550 nm wavelength. As in the following Table 4 and shown in FIG. 12 satisfying, among the conditions as listed Table 4, that the in-plane phase retardation and thickness direction phase retardation of the −B plate are 90 nm and −75, respectively, and the thickness direction phase retardation of the +C plate is 140 nm, it was confirmed that when the integral polarizer is applied to the IPS-panel, the inner protective films of the integral polarizer may have a minimum contrast ratio of 30:1 at an inclined angle of 75° in respect to all the longitudinal angles, which indicates that the integral polarizers of Comparative examples have poorer performances than that of Inventive example.

TABLE 4

| Inner protective film of first polarizer | IPS-LCD | Phase retardation of B plate | Thickness direction phase retardation of +C plate | Inner protective film of second polarizer | Minimum contrast ratio |
|---|---|---|---|---|---|
| TAC of 80 μm thickness and 0 nm phase retardation value | 330 nm | $R_{in}$ = 90 nm, $R_{th}$ = −65 nm | 130 nm | +C plate-coated-B plate | 40:1 |
| | | $R_{in}$ = 90 nm, $R_{th}$ = −75 nm | 140 nm | | 35:1 |
| | | $R_{in}$ = 100 nm, $R_{th}$ = −65 nm | 130 nm | | 30:1 |
| | | $R_{in}$ = 100 nm, $R_{th}$ = −75 nm | 140 nm | | 40:1 |
| | | $R_{in}$ = 110 nm, $R_{th}$ = −60 nm | 130 nm | | 30:1 |
| | | $R_{in}$ = 120 nm, $R_{th}$ = −75 nm | 150 nm | | 35:1 |

Therefore, it was confirmed that the polarizer according to one exemplary embodiment of the present invention has the advantageous effects.

The invention claimed is:

1. An in-plane switching liquid crystal display (IPS-LCD) comprising;
a first polarizing plate,
a second polarizing plate,
a horizontally oriented IPS panel disposed between the first and the second polarizing plates and filled with a liquid crystal having positive dielectric constant anisotropy ($\Delta\epsilon>0$),
in which an absorption axis of the first polarizing plate and an absorption axis of the second polarizing plate are orthogonal to each other, and an optical axis of the liquid crystal in the IPS panel and the absorption axis of the first polarizing plate are parallel with each other,
wherein the second polarizing plate is an integrated polarizer comprising:
a polarizing film;
a protective film attached to one surface of the polarizing film; and
a +A plate coated with a +C plate in the form of liquid crystals, the +C plate being attached to the other surface of the polarizing film to which the protective film is attached,
wherein the +A plate coated with the +C plate in the integrated polarizer is disposed on the side of the IPS panel, and
wherein a retardation film is not included between the first polarizing plate and the IPS panel.

2. The IPS-LCD of claim 1, wherein the +A plate has an in-plane phase retardation value of 30 to 500 nm.

3. The IPS-LCD of claim 1, wherein the +C plate has a thickness-direction phase retardation value of 60 to 100 nm.

4. The IPS-LCD of claim 1, wherein the +A plate coated with the +C plate in the form of liquid crystals has Nz ($|1-R_{th}/R_{in}|$) of 0.15 to 0.5.

* * * * *